(12) United States Patent
Jensen et al.

(10) Patent No.: US 12,104,579 B2
(45) Date of Patent: Oct. 1, 2024

(54) WIND TURBINE CANOPY WITH COOLING FLUID OUTLET

(71) Applicant: Siemens Gamesa Renewable Energy A/S, Brande (DK)

(72) Inventors: Simon Vyff Jensen, Tørring (DK); Morten Lauridsen Jensen, Oestjylland (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 1 day.

(21) Appl. No.: 17/863,482

(22) Filed: Jul. 13, 2022

(65) Prior Publication Data
US 2023/0036882 A1 Feb. 2, 2023

(30) Foreign Application Priority Data
Jul. 28, 2021 (EP) .................................. 21188121

(51) Int. Cl.
| | |
|---|---|
| *F03D 80/60* | (2016.01) |
| *F03D 15/00* | (2016.01) |
| *H02K 7/18* | (2006.01) |

(52) U.S. Cl.
CPC ............. *F03D 80/60* (2016.05); *F03D 15/00* (2016.05); *H02K 7/1838* (2013.01); *F05B 2220/706* (2013.01); *F05B 2260/20* (2013.01); *H02K 2205/09* (2013.01)

(58) Field of Classification Search
CPC ........ F03D 80/60; F03D 15/00; H02K 7/1838
See application file for complete search history.

(56) References Cited

U.S. PATENT DOCUMENTS

| | | | |
|---|---|---|---|
| 2007/0222223 A1* | 9/2007 | Bagepalli | H02K 9/02 290/55 |
| 2015/0211491 A1* | 7/2015 | Gudewer | F03D 80/60 290/55 |

FOREIGN PATENT DOCUMENTS

| | | |
|---|---|---|
| CN | 208057312 U | 11/2018 |
| EP | 2587052 A1 | 5/2013 |
| EP | 3270491 A1 * | 1/2018 |

* cited by examiner

*Primary Examiner* — Sean Gugger
(74) *Attorney, Agent, or Firm* — Schmeiser, Olsen & Watts LLP

(57) ABSTRACT

A canopy for a direct drive wind turbine is provided. The canopy includes an interface section configured for mechanically coupling the canopy to a generator, wherein the interface section includes at least one outlet configured to receive cooling fluid exhausted by the generator and eject the received cooling fluid. A wind turbine including such a canopy is also provided.

12 Claims, 5 Drawing Sheets

WIND TURBINE CANOPY WITH COOLING FLUID OUTLET

CROSS-REFERENCE TO RELATED APPLICATIONS

This application claims priority to EP Application No. 21188121.4, having a filing date of Jul. 28, 2021, the entire contents of which are hereby incorporated by reference.

FIELD OF TECHNOLOGY

The following relates to the field of wind turbines, in particular a canopy for a direct drive wind turbine. Furthermore, the following relates to a direct drive wind turbine comprising such a canopy.

BACKGROUND

The generator in a wind turbine, such as a direct drive wind turbine, is usually equipped with some kind of cooling system, e.g., in the form of a ventilation system that blows a cooling fluid through the stator cavity before it is exhausted to the surroundings. In so-called direct drive wind turbines where the generator is coupled directly to the rotor and hence arranged between the rotor and the nacelle, space limitations and other constraints present a challenge in the design of such cooling systems, in particular with regard to exhausting the used (hot) cooling fluid. Some known solutions involve an extensive amount of ducts and piping that is guided from the generator and through the nacelle in complicated ways such that it does not interfere with other parts and/or prevents access thereto.

Hence, there may be a need for simple and efficient cooling solutions that are easy to implement without interfering with room or accessibility constraints.

SUMMARY

An aspect relates to a canopy for a direct drive wind turbine is provided. The canopy comprises an interface section configured for mechanically coupling the canopy to a generator, wherein the interface section comprises at least one outlet configured to receive cooling fluid exhausted by the generator and eject the received cooling fluid.

This aspect of embodiments of the invention are based on the idea that at least one outlet is formed in the interface section such that the cooling fluid exhausted by the generator can be ejected directly to the outside surroundings of the wind turbine without the need for long and complex arrangements of ducts. In particular, the exhausted cooling fluid is not guided into the nacelle.

According to an embodiment of the invention, the interface section forms a circumferential shape about an axial direction of the wind turbine.

In other words, the interface section surrounds the axial direction and may in particular be formed as a round or circular section capable of being mechanically coupled to the generator of the direct drive wind turbine.

According to a further embodiment of the invention, the interface section comprises a tubular member extending in the axial direction of the wind turbine.

The tubular member may extend from the main part of the canopy towards the generator. The length (in the axial direction) of the tubular member is generally kept as short as possible in order to not extend the axial dimensions of the canopy more than necessary.

According to a further embodiment of the invention, the at least one outlet is formed in the tubular member and configured to eject the received cooling fluid in a radial direction.

In other words, the short tubular member provides a surface in which the at least one outlet is formed, such that the cooling fluid is ejected radially outwards.

The outlet may have a circular, elliptic, rectangular or any other shape that provides a sufficient cross-sectional area for ejecting the used cooling fluid.

This embodiment is particularly advantageous as it does not require any modification of the cross-sectional shape of the interface section of the canopy.

According to a further embodiment of the invention, the interface section comprises at least one radial protrusion in which the at least one outlet is formed.

In other words, the interface section is extended (in comparison to known interface sections) with at least one protrusion in the radial direction. The at least one protrusion allows forming of the at least one outlet.

This embodiment is particularly advantageous as it does not require any substantive extension of the interface section of the canopy in the axial direction.

According to a further embodiment of the invention, the at least one outlet is configured to eject the received cooling fluid in the axial direction.

In other words, the at least one outlet takes up a minimum of space in the axial direction.

According to a further embodiment of the invention, a cavity is formed between the canopy and the at least one radial protrusion, and the at least one outlet is configured to eject the received cooling fluid into the cavity.

The cavity assures that the used cooling fluid is ejected to the surroundings of the wind turbine generator.

According to a further embodiment of the invention, the at least one outlet comprises a plurality of outlets.

The plurality of outlets may in particular be arranged along the perimeter of the interface section with equal spacing between each outlet.

The plurality of outlets may comprise any number of outlets, such as in particular two, three, four, five, six, eight, 12 or 16 outlets.

According to a second aspect of embodiments of the invention there is provided a direct drive wind turbine comprising a rotor, a generator, and a nacelle arranged at an upper end of a tower. The nacelle comprises a canopy according to the first aspect or any of the above embodiments thereof.

This aspect of embodiments of the invention are generally based on the same idea as the first aspect and provides a wind turbine which benefits from the advantageous canopy of the first aspect as discussed above.

According to a further embodiment of the invention, the generator comprises at least one ventilation unit adapted to exhaust the cooling fluid towards the at least one outlet of the canopy.

The at least one ventilation unit, such as a fan or blower, is arranged close to the periphery of the generator and close to the corresponding at least one outlet of the canopy.

According to a further embodiment of the invention, the wind turbine further comprises at least one duct arranged to guide the exhausted cooling fluid to the at least one outlet.

The duct may in particular be arranged between the at least one ventilation unit and the at least one outlet. Alternatively, the duct may comprise the at least one ventilation unit.

According to a further embodiment of the invention, the cooling fluid is air.

The cooling air is sucked in from the surroundings of the wind turbine generator and blown and/or sucked through the stator cavity before it is exhausted from the generator and ejected through the at least one outlet in the canopy.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

BRIEF DESCRIPTION

Some of the embodiments will be described in detail, with reference to the following figures, wherein like designations denote like members, wherein.

DETAILED DESCRIPTION

Figure 1:
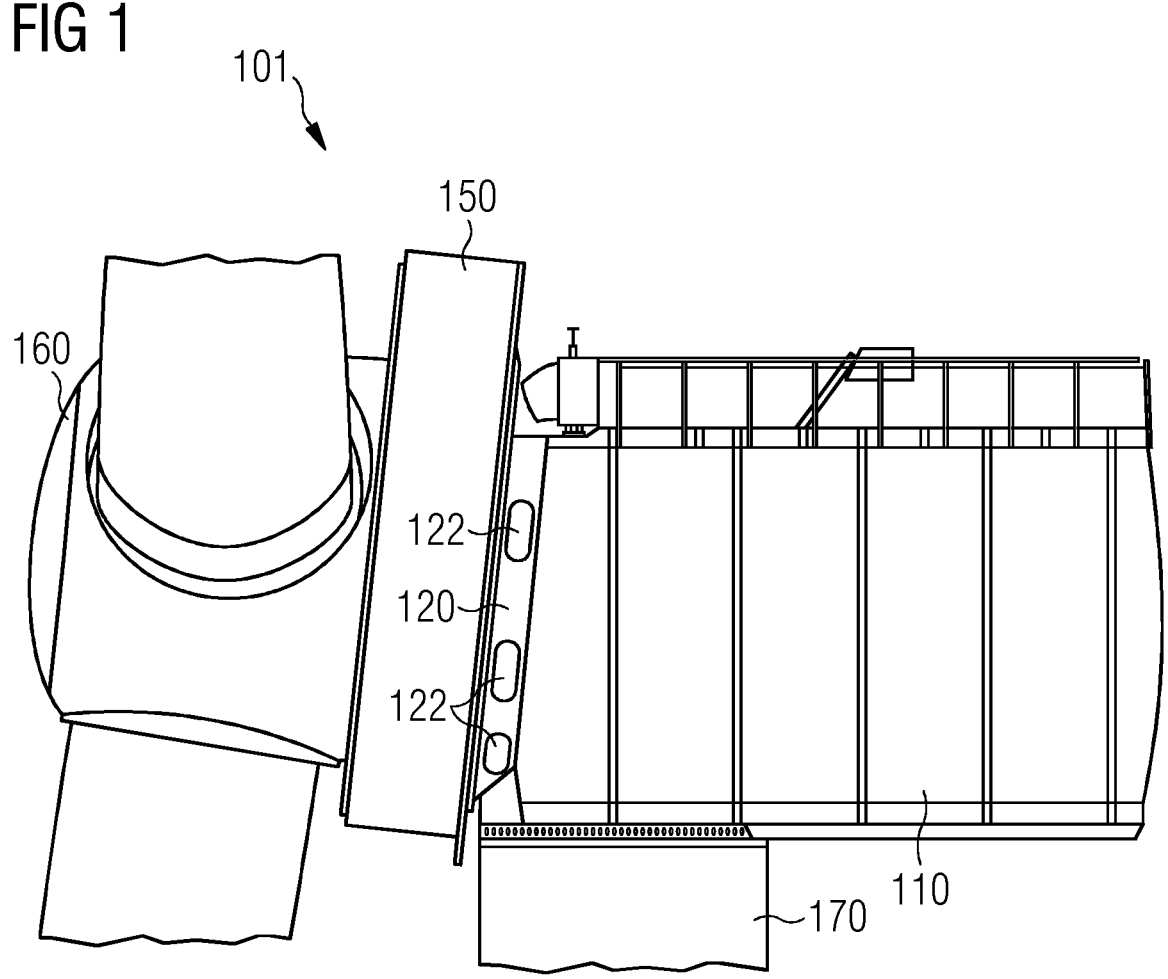
FIG. 1 shows a direct drive wind turbine according to an exemplary embodiment of the present invention.

The illustration in the drawing is schematic. It is noted that in different figures, similar or identical elements are provided with the same reference numerals or with reference numerals which differ only within the first digit.

FIG. 1 shows a direct drive wind turbine 101 according to an exemplary embodiment of the present invention. The wind turbine 101 comprises a nacelle enclosed in a canopy 110 and arranged at the upper end of tower 170. The canopy 110 comprises an interface section 120 which is mechanically coupled to generator 150 which is arranged between the canopy 110 and the rotor 160 of the wind turbine 101. The interface section 120 of the canopy 110 comprises several outlets 122 for ejecting cooling fluid exhausted by the generator 150.

Figure 2:
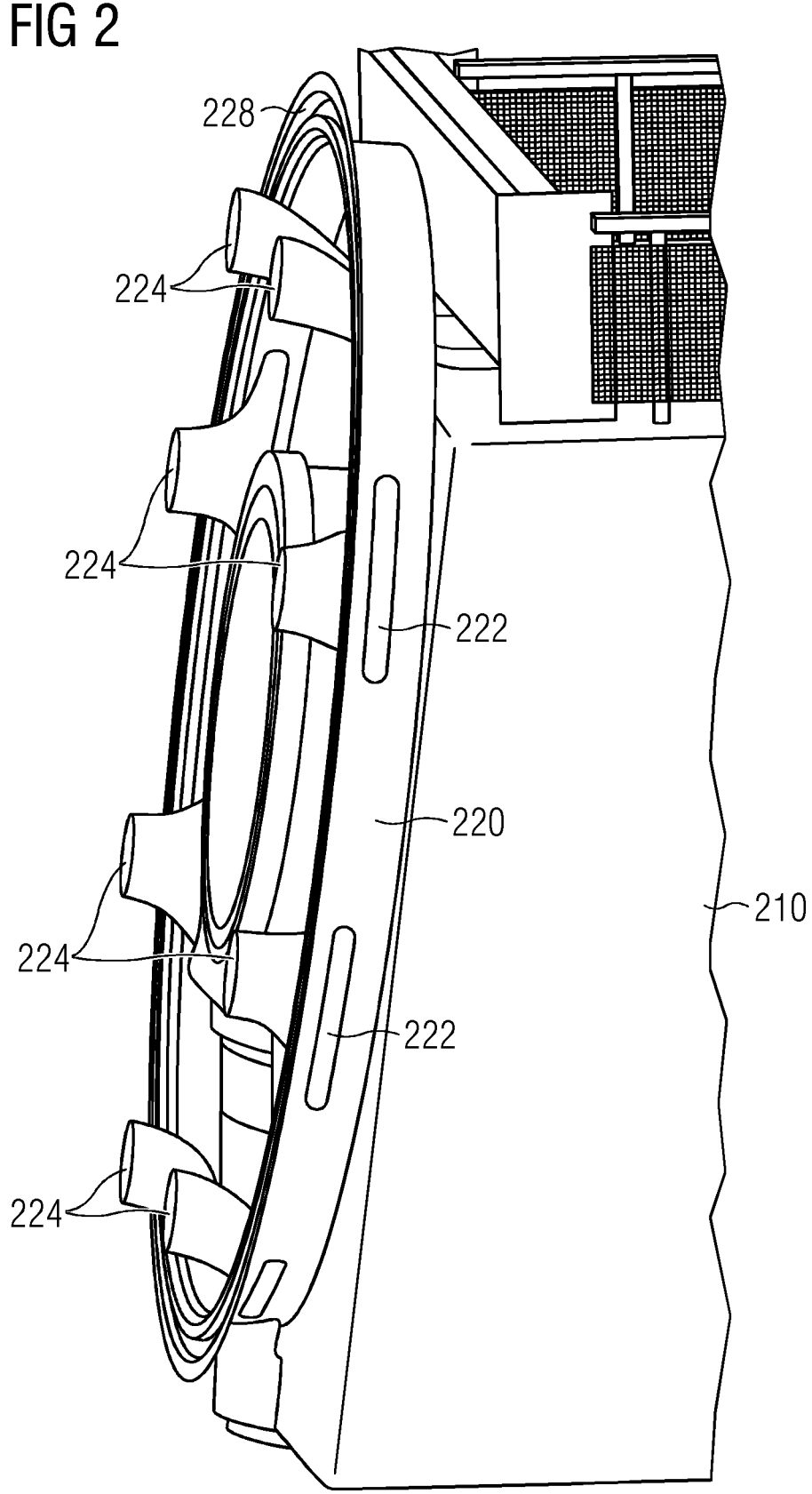
FIG. 2 shows a partial view of a canopy according to an exemplary embodiment of the present invention.

FIG. 2 shows a partial view of a canopy 210 according to an exemplary embodiment of the present invention. The canopy 210 comprises an interface section formed as a relatively short tubular member 220 with outlets 222 in the tubular surface of the interface section 220. A short duct 224 is inserted in each outlet opening 222. The ducts 224 are formed to receive used cooling fluid, e.g., hot air, exhausted by the generator (not shown) in the axial direction eject the fluid through the corresponding outlet opening 222 in the radial direction. The interface section 220 also comprises a flange or lip 228 configured to engage with a corresponding structure in the generator. In the present exemplary embodiment, eight outlets 222 and corresponding ducts 224 are arranged around the circumference of the tubular member 220. However, any number of outlets 222, such as one, two, three, four, six, 12 or 16 outlets 222, may be feasible and used in other embodiments of the present invention.

Figure 3:
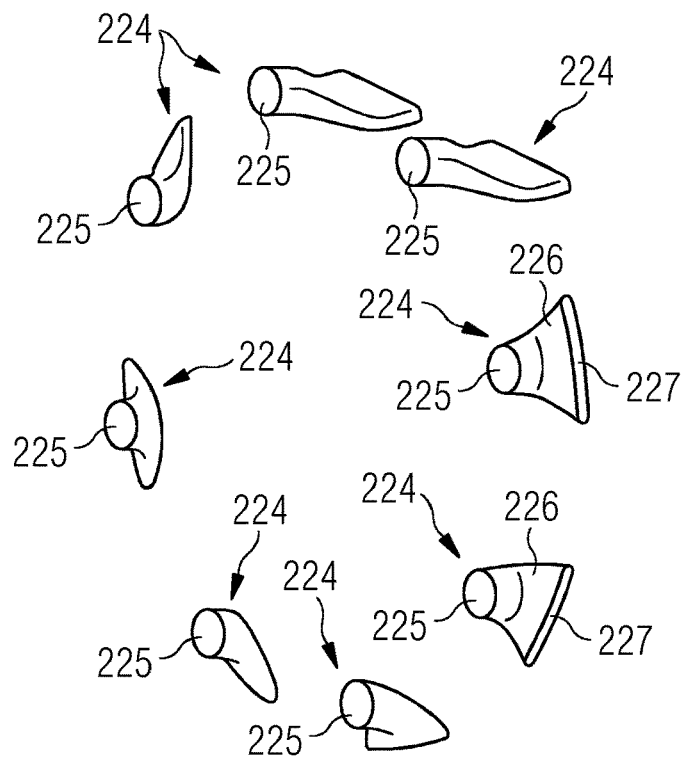
FIG. 3 shows a set of ducts used in the exemplary embodiment shown in FIG. 2.

FIG. 3 shows the set of ducts 224 used in the exemplary embodiment shown in FIG. 2. As shown, each duct 224 comprises an inlet opening 225 pointing in the axial direction of the wind turbine and thereby configured to receive cooling fluid from the generator (not shown). Furthermore, each duct 224 comprises a bent duct portion 226 shaped to change the flow direction of the exhaust cooling fluid from the axial to a radial direction corresponding to the orientation of the duct outlet 227 which fits into the outlet opening 222 shown in FIG. 2.

Figure 4:
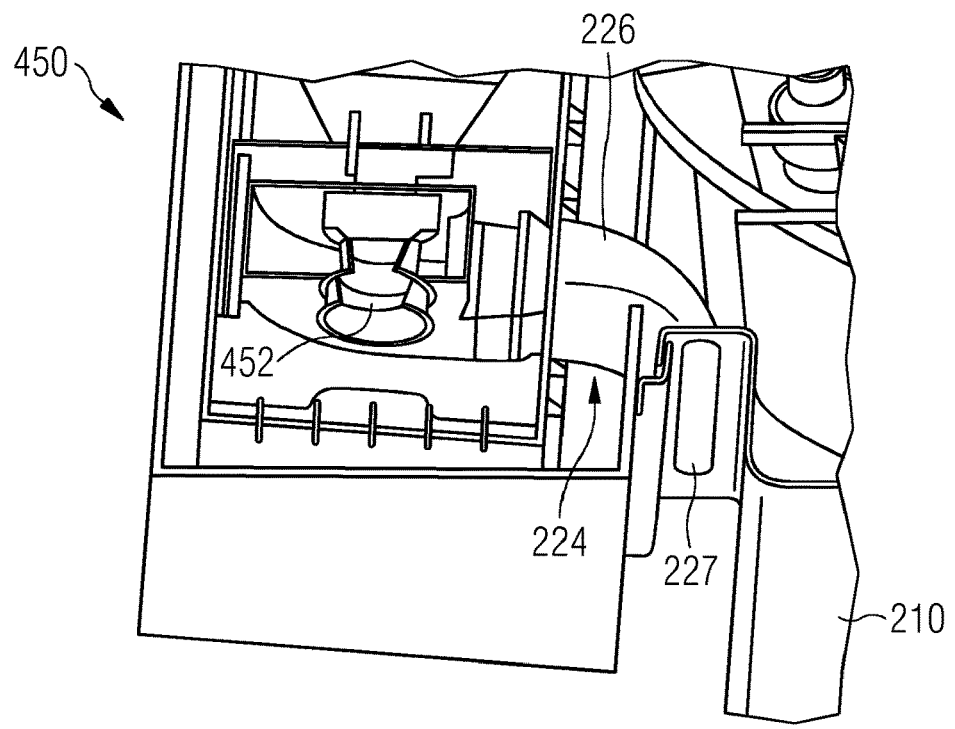
FIG. 4 shows a partial view of canopy and generator according to the exemplary embodiment shown in FIG. 2.

FIG. 4 shows a partial view of the canopy 210 and a generator 450 according to the exemplary embodiment shown in FIG. 2. The generator 450 comprises a ventilation unit (fan or blower) 452 arranged to convey exhausted cooling fluid from inside the generator 450 to the duct 224 such that it can be ejected in the radial direction through the duct outlet 227.

Figure 5:
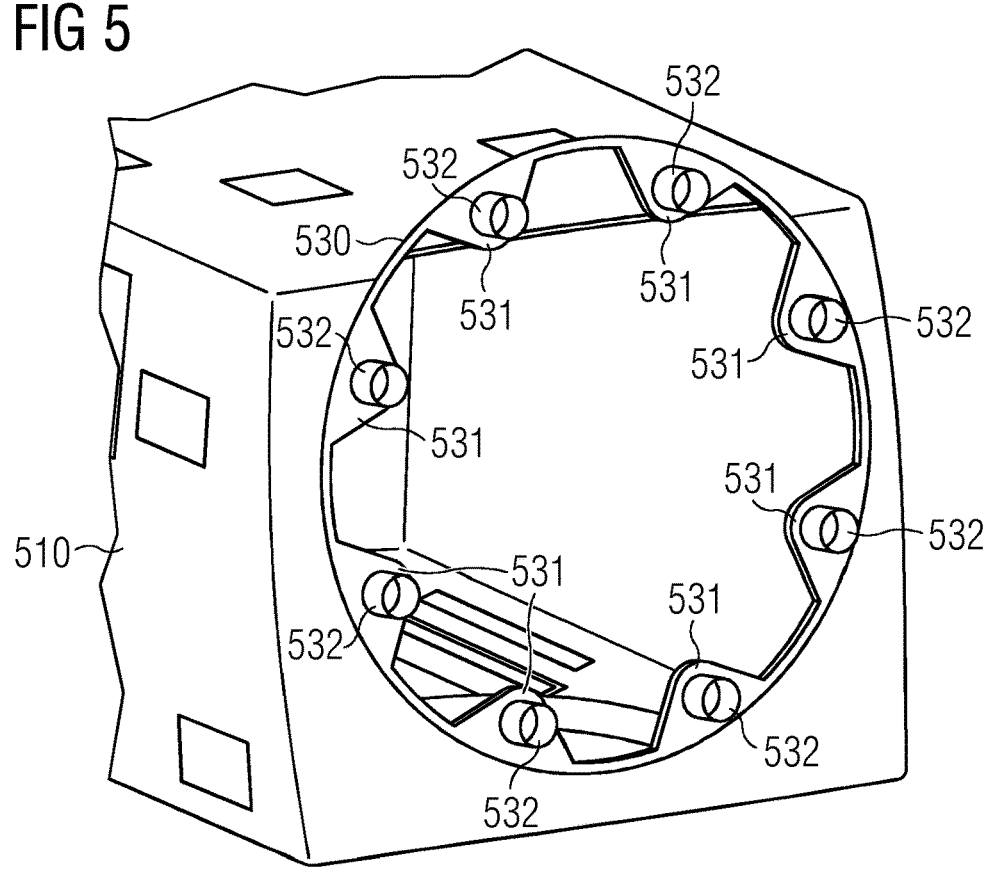
FIG. 5 shows a first partial view of a canopy according to a further exemplary embodiment of the present invention.

FIG. 5 shows a first partial view of a canopy 510 according to a further exemplary embodiment of the present invention. This embodiment differs from the one discussed above in conjunction with FIG. 2 to FIG. 4 in the shape of the interface structure 530 which comprises radial protrusions 531 extending inwards towards the axis of the wind turbine in order to accommodate axial fluid outlets (not shown in FIG. 5 but discussed further below in conjunction with FIG. 6) that are in communication with ducts 532 providing the exhaust cooling fluid from the generator (not shown).

Figure 6:
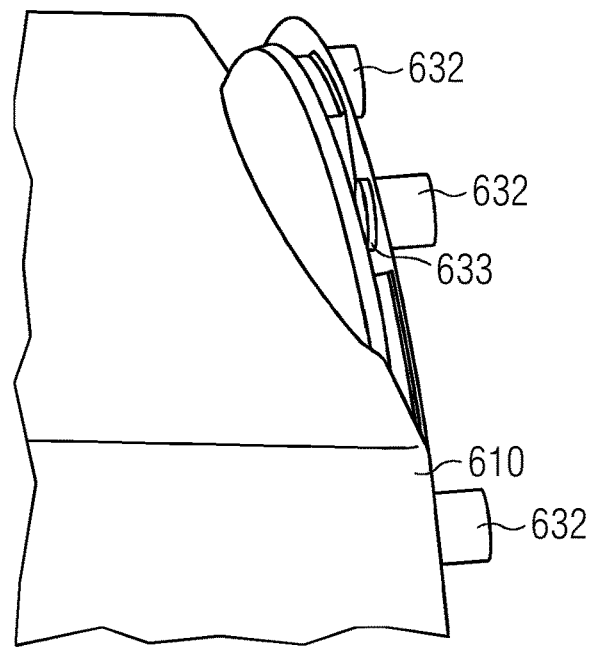
FIG. 6 shows a second partial view of the canopy according to the further exemplary embodiment shown in FIG. 5.

FIG. 6 shows a second partial view of the canopy 610 according to the further exemplary embodiment shown in FIG. 5. In this second partial view, one of the outlets 633 can be seen. Furthermore, it can be seen that the outlet 633 ends in a small pocket formed in the protrusion 531 (see FIG. 5) and thus ejects the received cooling fluid in the axial direction.

Figure 7:
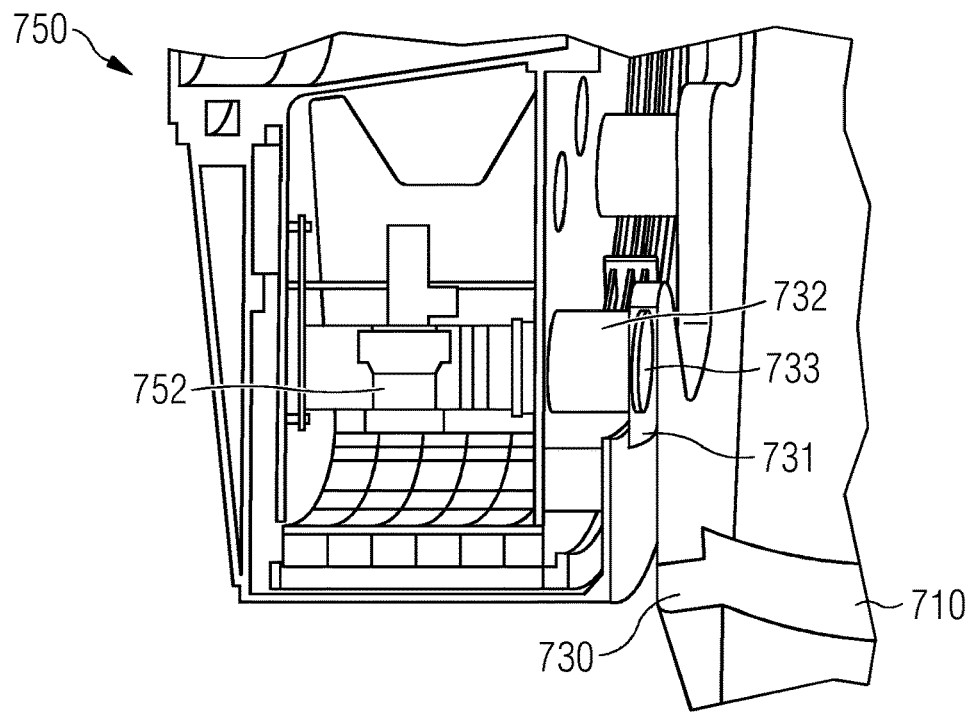
FIG. 7 shows a partial view of canopy and generator according to the further exemplary embodiment shown in FIG. 5 and FIG. 6.

FIG. 7 shows a partial view of canopy 710 and generator 750 according to the further exemplary embodiment shown in FIG. 5 and FIG. 6. Like in the embodiment discussed in conjunction with FIG. 2 to FIG. 4, the generator 750 comprises a ventilation unit (fan or blower) 752 arranged to convey exhausted cooling fluid from inside the generator 750 to the duct 732 such that it can be ejected in the axial direction through the duct outlet 733 and into the pocket formed in the protrusion 731 before escaping to the surroundings of the wind turbine.

Figure 8:
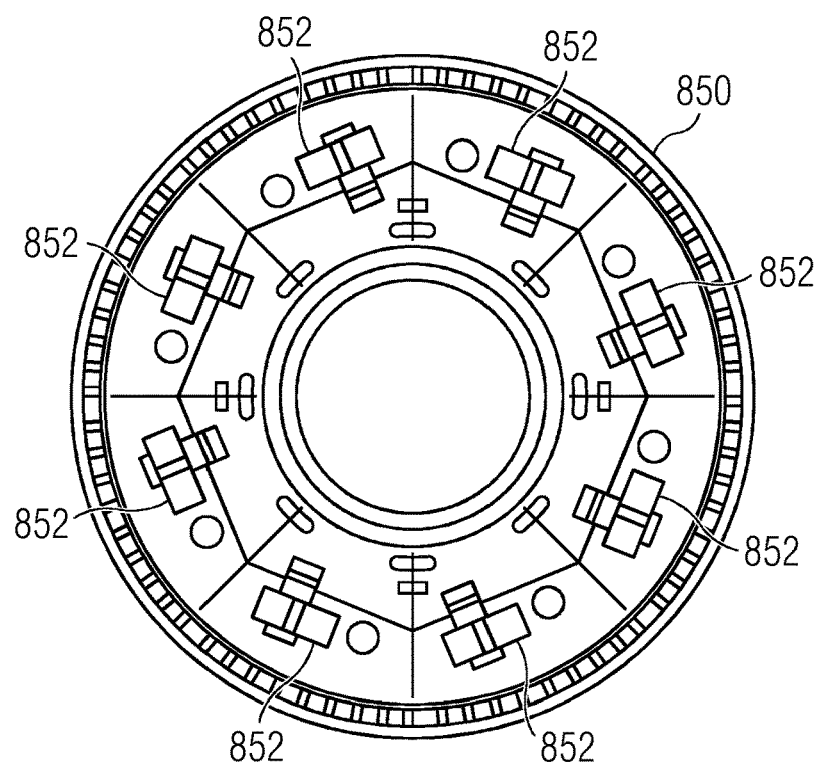
FIG. 8 shows a cross-sectional view of the generator shown in FIG. 7.

FIG. 8 shows a cross-sectional view of the generator 850 shown in FIG. 7. As shown, the generator 850 comprises a total of eight ventilation units 852 arranged close to the outer circumference of the generator 850 such that they can be connected to corresponding ducts (e.g., ducts 732 in FIG. 7)

which are in communication with corresponding outlets. Again, it is noted that any other number of ventilation units 852 may be used in other exemplary embodiments, such as one, two, three, four, six, 12 or 16 ventilation units 852.

As shown above, both exemplary embodiments provide simple and compact structures for ejecting used generator cooling fluid through outlets formed in the interface section of the canopy. While the embodiment shown in FIG. 2 to FIG. 4 relies on a short tubular member adding a bit to the length of the canopy but without affecting the cross-section of the interface between canopy and generator, the embodiment shown in FIG. 5 to FIG. 8 avoids any axial extension by instead adding protrusions along the circumference of the interface section.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A canopy for a direct drive wind turbine, the canopy comprising:
an interface section mechanically coupled to a generator and configured for mechanically coupling the canopy to the generator, the interface section arranged between the canopy and a rotor of the direct drive wind turbine, wherein the interface section comprises at least one outlet configured to receive cooling fluid exhausted by the generator and eject the cooling fluid without guiding the cooling fluid into a nacelle of the direct drive wind turbine.

2. The canopy according to claim 1, wherein the interface section forms a circumferential shape about an axial direction of the wind turbine.

3. The canopy according to claim 1, wherein the interface section comprises a tubular member extending in an axial direction of the wind turbine.

4. The canopy according to claim 3, wherein the at least one outlet is formed in the tubular member and configured to eject the cooling fluid in a radial direction.

5. The canopy according to claim 1, wherein the interface section comprises at least one radial protrusion in which the at least one outlet is formed.

6. The canopy according to claim 5, wherein the at least one outlet is configured to eject the cooling fluid in an axial direction.

7. The canopy according to claim 5, wherein a cavity is formed between the canopy and the at least one radial protrusion, and wherein the at least one outlet is configured to eject the cooling fluid into the cavity.

8. The canopy according to claim 1, wherein the at least one outlet comprises a plurality of outlets.

9. A direct drive wind turbine comprising a rotor, a generator, and a nacelle arranged at an upper end of a tower, wherein the nacelle comprises the canopy according to claim 1.

10. The wind turbine according to claim 9, wherein the generator comprises at least one ventilation unit configured to exhaust the cooling fluid towards the at least one outlet of the canopy.

11. The wind turbine according to claim 9, further comprising at least one duct arranged to guide the exhausted cooling fluid to the at least one outlet.

12. The wind turbine according to claim 9, wherein the cooling fluid is air.

\* \* \* \* \*